United States Patent [19]

Foster

[11] Patent Number: 5,306,153

[45] Date of Patent: Apr. 26, 1994

[54] EDUCATIONAL DEVICE FOR DEVELOPING VOCABULARY AND SPELLING SKILLS

[76] Inventor: Margaret J. Foster, Box 24482, Christensted, St. Croix, V.I. 00824

[21] Appl. No.: 58,305

[22] Filed: May 10, 1993

[51] Int. Cl.⁵ ................................................ G09B 1/30
[52] U.S. Cl. ................................... 434/170; 434/167; 434/172
[58] Field of Search .................. 434/170, 167, 172

[56] References Cited

U.S. PATENT DOCUMENTS

| | | |
|---|---|---|
| 364,845 | 6/1887 | Oakley ............................ 434/167 |
| 1,110,434 | 9/1914 | Garman ........................... 434/172 |
| 1,428,456 | 9/1922 | Stranders . | 
| 1,512,147 | 10/1924 | Tegtmeyer et al. . |
| 2,581,595 | 1/1952 | Mioduski et al. . |
| 3,769,721 | 11/1973 | Reiner . |
| 3,813,471 | 5/1974 | Dean, III . |
| 5,145,183 | 9/1992 | Gates . |

FOREIGN PATENT DOCUMENTS 1021094 2/1966 United Kingdom .

OTHER PUBLICATIONS

Brochure, "Boggle-Parker Brothers Hidden WORD Game," pub. by Parker Brothers, Div. of General Mills Fun Group, Inc., 2 pages, ©1973.

*Primary Examiner*—John G. Weiss
*Assistant Examiner*—Jeffrey A. Smith
*Attorney, Agent, or Firm*—Nies, Kurz, Bergert & Tamburro

[57] ABSTRACT

An educational device for broadening one's vocabulary and for developing spelling skills. The device includes a generally rectangular board member that is divided by printed, colored lines into several rectangular sections. Each rectangular section includes a pictorial representation of an object, along with the spelled word corresponding with the name of that object, and a series of side-by-side tile positioning indicia next to the spelled word associated with the illustrated object. A plurality of letter tiles of substantially uniform shape are provided, each letter tile bearing the same color as that of the dividing lines on the board member with which it is to be used, and also bearing a letter of the alphabet on at least one surface. The letter tiles are of a shape and size to conform with the shape defined by the tile positioning indicia carried by the board member, to enable one using the device to spell the name of the object, either with only the pictorial representation of an object displayed, or with both the pictorial representation and the spelled word exposed to the user. Pairs of words on the board member are anagrams, to demonstrate that different words can be spelled by using the same letters.

15 Claims, 3 Drawing Sheets

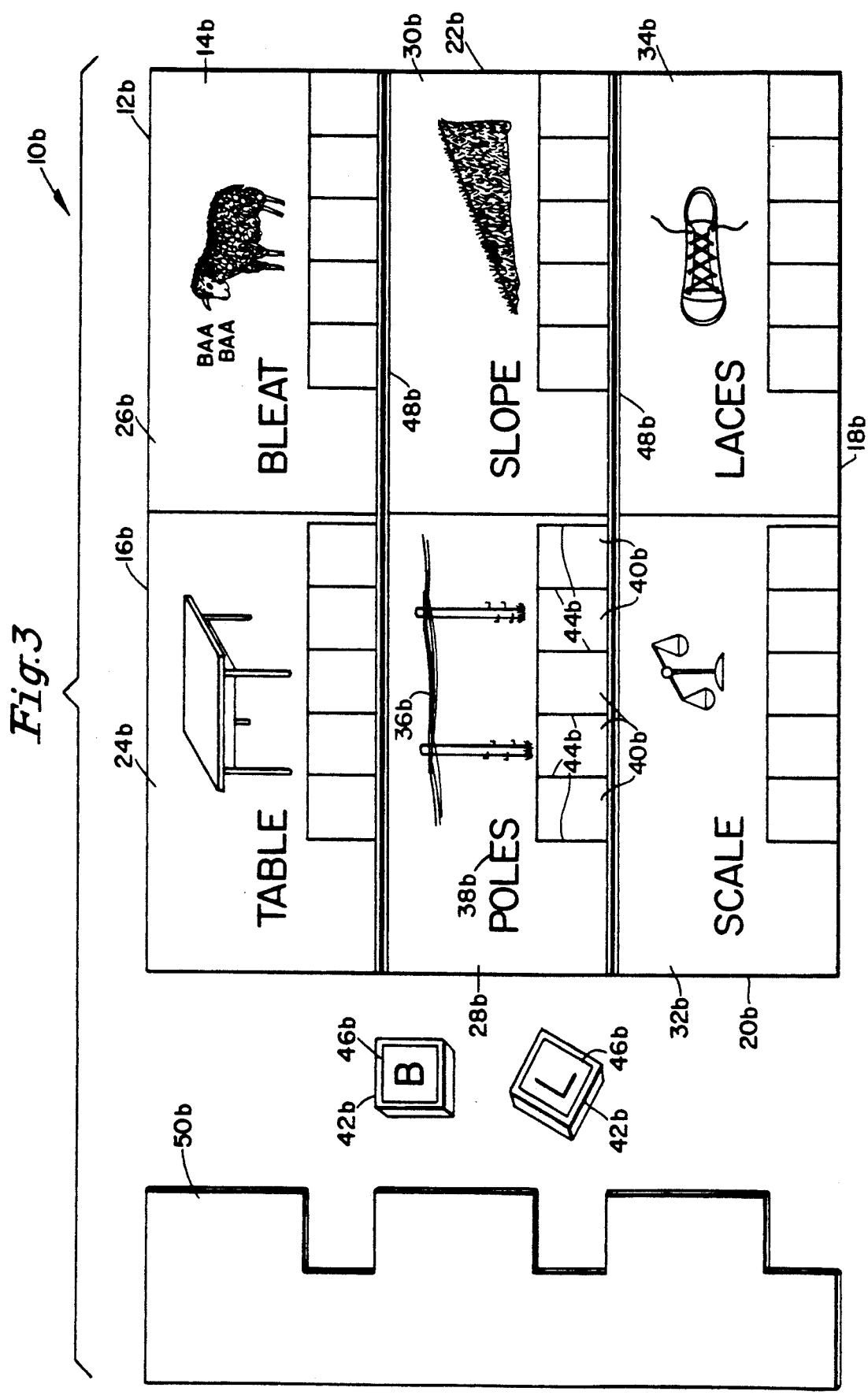

ary and spelling skills. More particularly, the present invention relates to an educational device in the form of one or more boards bearing different sets of pictures of individual animals or objects, the spelled names of the animals or objects adjacent to the respective pictures, and associated spaces for receiving appropriate letter tiles, along with a set of letter tiles that are adapted to be positioned by a user within appropriate ones of the spaces to properly spell the name of the animal or object, and thereby develop and improve the user's vocabulary skills and spelling facility.

2. Description of the Related Art

Learning tools for stimulating the educational development of children and for supplementing and reinforcing learning developed through organized educational activities, such as nursery or pre-schools, and the like, have been in great demand over the years by parents. In response to that demand a number of different devices have been developed in the past in an attempt to provide an interesting and challenging way to develop a child's vocabulary, as well as his or her ability to spell correctly. For example, in U.S. Pat. No. 1,428,456, which issued on Sep. 5, 1922, to Walter Stranders, there is disclosed an educational apparatus in the form of a panel bearing an illustration of an object, such as an animal, the panel including a series of adjacent, aligned strips of different colors that extend along the bottom edge of the panel. Accompanying the panel is a series of smaller, letter plates, each letter plate bearing a single letter forming part of the name of the object. Each letter plate includes a colored strip above the letter and along the uppermost edge of the plate. The colored strips associated with particular letters correspond in color with the colored strips along the bottom edge of the panel, to thereby permit the user to associate a given letter plate with a particular position along the bottom edge of the panel, so that the user can see the name of the object that is depicted in the illustration and its proper spelling.

In U.S. Pat. No. 3,183,471, which issued May 28, 1974, to Clarence T. Dean, III, there is shown a spelling toy in the form of a spelling board having horizontally-extending colored strips divided into a series of adjacent colored squares of the same color, onto which correspondingly colored numerical digits and alphabetical characters are adapted to be positioned. A series of vertical columns are defined by horizontally spaced vertical lines, and each column is headed with a number. The numeral digits and alphabetical characters each also carry on their surface a number that corresponds with the number of the column in which the digit or character is to be positioned. The coloration of the numerical digits and alphabetical characters, together with their columnar indication, assists and facilitates a child's placing the character or digit in the proper position on the board to spell a word. No illustrations are provided to identify the object that the word identifies.

Another form of spelling teaching aid is disclosed in United Kingdom Patent No. 1,021,094, which was published on Feb. 23, 1966, and which discloses a base member in the form of a rectangular element having a number of smaller, rectangular-shaped, aligned recesses. A preprinted panel is placed over the surface of the base member and is positioned by means of several positioning holes at corners of the panel, each positioning hole adapted to mate with a similar number of upstanding positioning pegs carried by the base member. Each preprinted panel includes several illustrations, each illustration showing a separate object, and next to each illustration are a number of groups of circular apertures or perforations, each group of perforations arranged in a different, predetermined pattern. Small, square blocks or tiles are also provided, each tile having a letter on one major surface and a number of outwardly extending pegs arranged in a predetermined pattern on the opposite major surface. Each tile is adapted to be positioned on a panel so that the pegs of the tile engage corresponding perforations in the panel, to thereby ensure that the letter tiles are properly positioned to spell the word that corresponds with the object illustrated. The device relies principally upon a child's spatial perception of the grouping of pegs and perforations, and his or her manipulative skill in properly positioning tiles on the preprinted panels.

Although the prior art devices each have some degree of educational merit, they each have their limitations. Moreover, the prior art devices described briefly above do not clearly demonstrate the fact that a single group of letters can form different words, to thereby challenge and stimulate a child to explore the world of words.

It is an object of the present invention to provide an improved educational device for developing vocabulary and spelling skills, one that is of simple construction, that is adaptable for use over a wide age range, and that permits the user to arrange a group of letters to form one word, and then to rearrange those letters to form a new and different word.

SUMMARY OF THE INVENTION

Briefly stated, in accordance with one aspect of the present invention, an educational device is provided for developing facility in the spelling of words and the recognition of words. The device includes a plurality of tiles of substantially uniform shape, each tile bearing a predetermined identifying color and also bearing an alphabet letter on at least one surface. A board member is provided, the board member having a tile-receiving surface for receiving a plurality of tiles at predetermined areas on the board member. The predetermined areas are defined by dividing lines and each area includes aligned tile positioning indicia carried by the board member and positioned to enable a user to spell a word by placing appropriate letter-bearing tiles on respective position indicia. The board member also includes pictorial indicia in each predetermined area adjacent groups of tile positioning indicia, the pictorial indicia representative of objects whose names are to be spelled by placing appropriately lettered tiles in the tile positioning indicia.

BRIEF DESCRIPTION OF THE DRAWINGS

FIG. 3 is a plan view similar to FIG. 1 showing similar elements for a further embodiment of the present invention directed to five-letter words.

DESCRIPTION OF THE PREFERRED EMBODIMENTS

Figure 1:
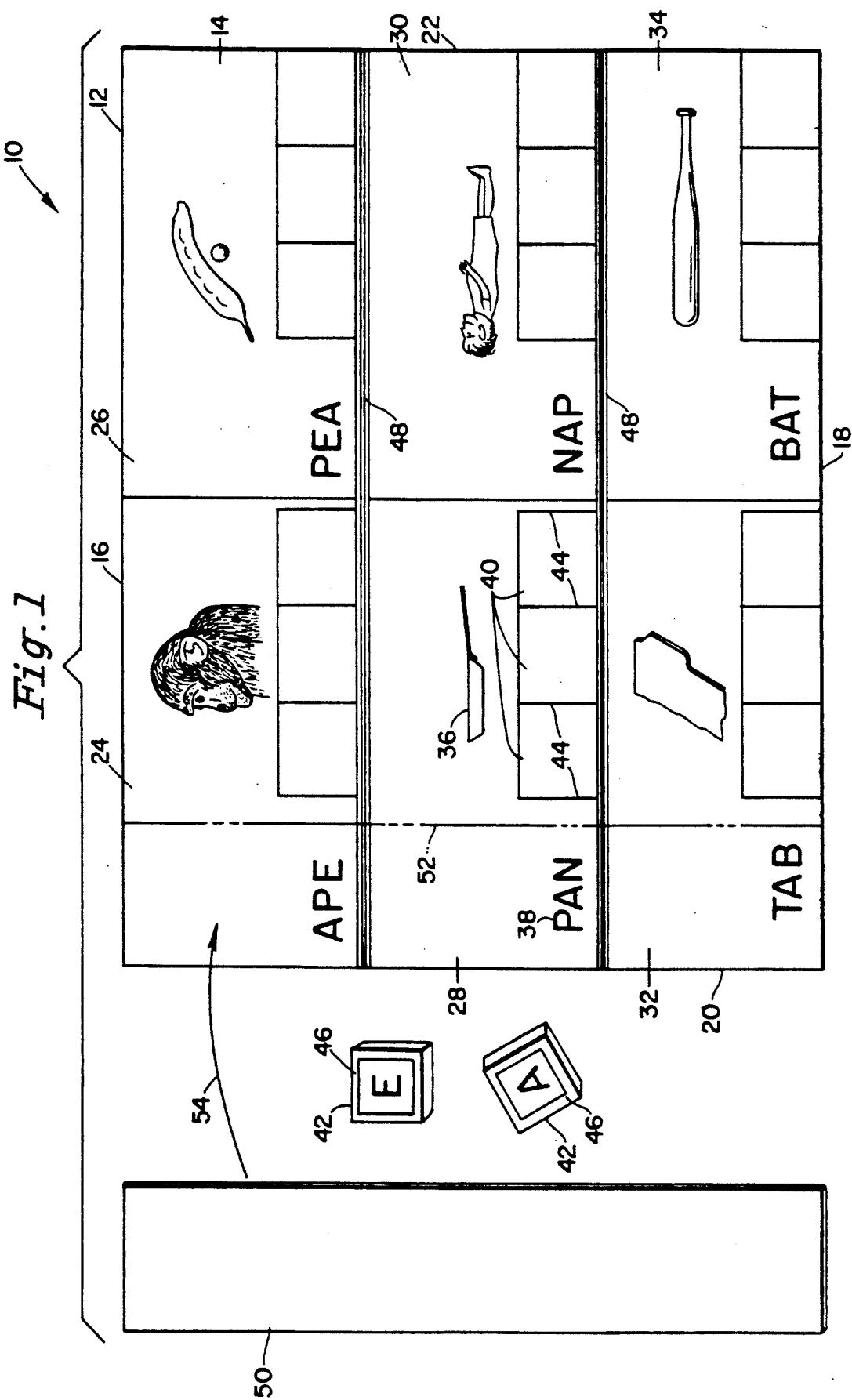
FIG. 1 is a plan view of the several elements constituting an educational device in accordance with the present invention, wherein a board contains representations of objects having names consisting of three letters, letter tiles are provided for placement on the board, and a cover member is provided for covering the names of the objects.

Referring now to the drawings, and particularly to FIG. 1 thereof, there is shown an educational device 10 in accordance with the present invention. Device 10 includes a rectangular board member 12 that can be a thin, flat, relatively rigid structure of heavy paperboard or cardboard that preferably has a smooth, planar front face 14 without depressions or raised areas. Board member 12 is defined by a pair of spaced, opposed, parallel longitudinal edges including a top edge 16 and a bottom edge 18, and a pair of spaced, opposed, parallel transverse edges including a left side edge 20 and a right side edge 22. Board member 12 can be of any desired size, and merely as an example of size each of top and bottom edges 16 and 18 can have a length of 11 inches, and left and right edges 20 and 22 can have a length of 8½ inches.

Front face 14 of board member 12 is preferably subdivided into a number of substantially equal rectangular areas, such as the six rectangular areas 24, 26, 28, 30, 32, and 34 shown in FIG. 1. Each of the rectangular areas has its respective longer sides parallel with top and bottom edges 16 and 18, and its respective shorter sides parallel with left and right edges 20 and 22. Within each rectangular area there is positioned an illustration in the form of a pictorial representation of an object, such as, for example, the pan 36 within rectangular area 28. Also contained within rectangular area 28 is the spelled name 38 of the object that is illustrated, in this instance the word "PAN," which preferably is positioned immediately above and adjacent one end of the longitudinally extending line defining the lower edge of rectangular area 28.

Immediately to one side of spelled name 38 are a series of adjacent boxes 40 corresponding in number with the number of letters contained in spelled name 38. Each of boxes 40 can be of any desired size or shape, and as shown in FIG. 1 they are of generally rectangular form, such as a square, and each side can be approximately ½ inch in length. Preferably, and as shown in FIG. 1, adjacent boxes 40 are contiguous with each other, although they can be spaced from each other if desired.

The foregoing description of the contents of rectangular area 28 is illustrative of the contents of the remaining rectangular areas, and it should be understood that the remaining areas are similarly configured, but have representations and the spelled names of different objects or animals. However, it is preferred that all words contained on a given board member 12 contain the same number of letters, three in this instance.

Also forming part of the present invention are a plurality of letter tiles 42, only two of which are shown in FIG. 1, each of which is of a size and shape that corresponds with the size and shape of the individual boxes 40 that appear on the surface of board member 12. Letter tiles 42 are also preferably of thin, flat, substantially rigid construction, and without any recesses or surface projections, so that they can slide unimpeded over the surface of board member 12. As was the case with board member 12, letter tiles 42 can also be made from heavy paperboard or cardboard, if desired, but preferably they have a thickness of at least about 1/16 inch for ease of handling by small children.

Individual boxes 40 on board member 12 preferably are defined by colored border lines 44 of the same preselected color. Similarly, letter tiles 42 can also include broad, colored border lines 46 along each edge, and preferably of the same preselected color as that of the border lines 44 on board member 12, to permit a user to readily associate those letter tiles with a particular board member 12, as will hereinafter be explained. Although illustrated and described in terms of border lines 46, it will be appreciated that the preselected color as applied to the letter tiles can alternatively be uniformly applied over the entire flat, upper surface of the tiles, if desired, as long as the color is such that the letter carried by the tiles is distinct and can be clearly seen.

Preferably, board member 12 also includes a pair of broad, longitudinally extending separation lines 48 along the lowermost longitudinal edges of each of upper rectangular boxes 24 and 26 and along the lowermost longitudinal edges of intermediate rectangular boxes 28 and 30. Separation lines 48 serve as guide lines for the eyes of a user, to direct the user's eyes along a longitudinal direction and thereby encourage the user to read in a longitudinal direction, rather than in a downward direction.

As also shown in FIG. 1, a flat, rectangular cover member 50 in the form of a narrow rectangular strip of opaque material can be provided to serve as a cover sheet, as will hereinafter be explained.

In use, the user, usually a small child, is presented with a board member 12 and with a number of letter tiles having edge lines 46 of the same color as the color of lines 44 defining boxes 40 on the board member. The word representing the name of an illustrated object shown on the board member is spelled by the user by placing appropriate letter tiles 42 in the appropriate boxes 40, to thereby arrange a group of the letter tiles bearing the same letters and in the same sequence as the printed letters on the board member corresponding with the name of the object illustrated. The user can then associate the word that has been spelled with the object shown in the illustration, and he will also be able to visualize and remember the correct spelling of the word.

As is apparent from the words as shown on board member 12 as illustrated in FIG. 1, each of the words in a pair of horizontally-separated words is an anagram in that each word includes the same letters, but those letters are arranged in a different sequence to spell an entirely different word. Consequently, the user will come to appreciate that the same letters can form different words.

Once the user has learned to recognize the names of the objects from viewing the illustrations of the objects on the board member, cover sheet 50 can be used to cover the three words in a given vertical array on board member 12 to enable the student to test his spelling skill by spelling the name of the object solely by viewing and identifying the object shown in the illustration. Cover sheet 50 is of such a size as to extend both horizontally and vertically a distance sufficient to completely cover each of the three words in a column, such as the words APE, PAN, and TAB, as shown by the dashed line 52 in FIG. 1, but not to cover either the illustrations of the objects or their associated boxes 44, so that the names of the objects in a column are obscured but their associated pictorial representations remain visible.

The user places the cover sheet over the words in a column, by moving the sheet onto board member 12 in the direction shown by arrow 54, so that the names in a column are covered, leaving the illustrations of the objects and the adjacent boxes 40 exposed to view. The user must then place the proper letter tiles 42 on the appropriate boxes 40 on the board member to correctly spell the name of the object that is shown immediately above that group of boxes. The colors on the tiles and the colors of the boxes serve as a guide or hint to the user.

After each of the groups of boxes in a column has been covered with letter tiles, the user can remove the cover sheet to expose the correctly spelled name of the object, and he can thereby compare the accuracy of his spelling of the name in letter tiles with the correctly-spelled names that are carried on the board member.

Broad, horizontally-extending lines 48 serve as orientations to the user that the correct positioning of letters and the spelling of words is accomplished in a horizontal direction.

Board member 12 shown in FIG. 1 includes words that have only three letters, and preferably all the boxes on board member 12 are of the same color, either in outline as shown, or overall.

Figure 2:
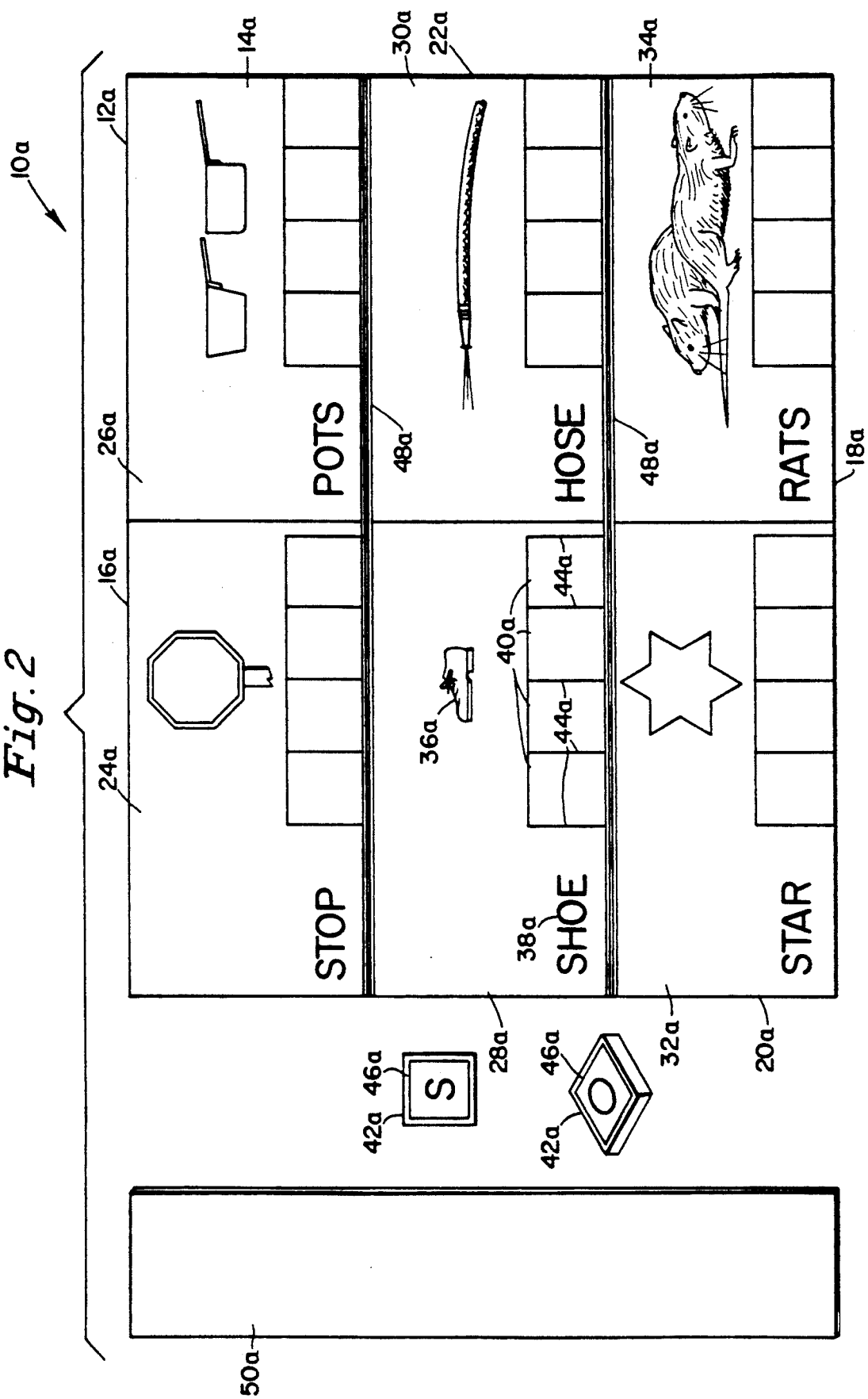
FIG. 2 is a plan view similar to FIG. 1 showing similar elements for another embodiment of the present invention directed to four-letter words.

Referring now to FIG. 2, there is shown an additional and similar board member 12a that carries different pictorial illustrations, which represent objects whose names are words having four letters, as opposed to the three letters on board member 12 of FIG. 1. Preferably, boxes 40a on board member 12a, and also tiles 42a, are each of the same color, but are of a different color from the tiles and boxes for the three-letter word embodiment shown in FIG. 1. Cover sheet 50a is similar to the cover sheet used in the embodiment shown in FIG. 1, except that it is slightly wider to cover the additional length of the four-letter words, as compared with the three-letter words.

FIG. 3 shows educational device elements similar to those shown in FIGS. 1 and 2, except that board 12b has illustrations representing objects having names defined by words having five letters. Again, it is preferred that the coloration applied to the letter tiles, as well as the coloration employed in defining the boxes on board member 12b, be of a color different from the color employed in the three-letter word embodiment shown in FIG. 1, and also different from the color employed the four-letter word embodiment shown in FIG. 2.

Because the total horizontal extent of five boxes 40b for placement of the letter tiles for the five-letter words might be such that the available space on board member 12b does not permit the positioning of the printed name of the object in side-by-side relationship with the associated boxes 40b, the printed five-letter object names can be positioned above one or more of the boxes to avoid a board member of excessive horizontal length, or to avoid making the printed letters too small in size. In that event, cover sheet 50b for the five-letter word embodiment of the invention can have a different shape from cover sheets 50 and 50a that are used with the board members shown in FIGS. 1 and 2, respectively. In that connection, cover sheet 50b for five-letter word board member 12b can be in the form of a letter "E," as shown in FIG. 3, with the horizontally-extending portions of the cover sheet spaced from each other a distance corresponding with the spacing between the printed names on board member 12b. Additionally, the vertical leg of cover sheet 50b can be made slightly longer, by the height of one letter box 44b, so that the cover sheet has an overall height to extend from the upper edge of board member 12b to the lower edge thereof.

The present invention is such that it lends itself to the provision of a number of different board members to provide a wide variety of words to stimulate and challenge the user. For example, additional three-, four-, and five-letter words are presented below as examples of illustrations and words that can be used to provide additional board members for a more varied learning experience.

| THREE-LETTER WORDS | |
|---|---|
| ADD | DAD |
| RAM | ARM |
| SAG | GAS |
| FOUR-LETTER WORDS | |
| LAMP | PALM |
| CHIN | INCH |
| FIVE-LETTER WORDS | |
| HORSE | SHORE |
| MELON | LEMON |
| WORDS | SWORD |

In its preferred form each board member contains six illustrations and their associated names and boxes. Thus, for board members containing three-letter words only nine letter tiles are necessary for a given board member, because three of the words are anagrams of the other three words. Similarly, for board members containing four-letter words only twelve letter tiles are needed, and for board member containing five-letter words only fifteen letter tiles are needed.

As used herein, the term "board member" means a generally flat, thin, rectangular panel that is preferably rigid. The board member can optionally be provided with a fold or a hinge line extending from top to bottom along a line dividing two vertically-arranged groups of illustrations and words, to permit the board member to be folded over itself in order to reduce the space needed to store the board and also to reduce the size of a package in which the present invention can be marketed.

Although the board as illustrated and described herein is a flat board having a planar surface, if desired, the squares for receiving the letter tiles can be in the form of surface recesses, formed by embossing, or the like, in the surface of the board member to retain the tiles in position once they have been placed on the board surface. However, it should be noted that the present invention does not include any upwardly-extending projections from either the front face of the board member or from the rear face of a letter tile, thereby simplifying the manufacture of the elements forming the present invention.

It will be apparent to those skilled in the art that the present invention provides distinct advantages over the prior art arrangements, in that it permits a broader range of words and anagrams to be presented for a richer learning experience, one that is both fun and challenging for children. Additionally, the invention provides a visual and tactile means for children to become comfortable with words, and with their spelling. Further, the color coordinated tiles and board members for the different groups of words having the same number of letters provides a color coding arrangement that facilitates the selection of letter tiles for use with a particular board member.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An educational device for developing vocabulary and spelling skills, said device comprising:
   a. a plurality of substantially flat tiles, each tile bearing the same predetermined identifying color and bearing a letter of the alphabet on at least one surface; and
   b. a board member having a tile-receiving surface for receiving a plurality of titles, the tile-receiving surface divided into a plurality of substantially rectangular board areas by dividing lines, the dividing lines defining a plurality of rows of board areas and a plurality of columns of board areas, each board area including pictorial indicia representative of a respective object having a name that is to be spelled, each board area including a plurality of tile positioning indicia equal in number to the number of letters in the name of the object illustrated in the board area, the tile positioning indicia including the same predetermined color as the identifying color borne by the tiles and oriented to allow a user to place a tile on each of the tile positioning indicia to spell the name of the object illustrated in the board area by selecting appropriate letter-bearing tiles and placing the selected tiles on the tile positioning indicia within the board area to spell the name of the illustrated object, and object name indicia carried by the board member adjacent associated pictorial indicia within a board area to spell the name of the object illustrated in the board area, the object name indicia spaced from the tile positioning indicia to permit the object name indicia to be covered while the tile positioning indicia remain uncovered.

2. An educational device in accordance with claim 1 including a cover member for covering selected portions of the surface of the board member, the cover member having a size and shape to enable the cover member to cover the object name indicia in a given column of board areas on the surface of the board member while leaving uncovered the pictorial representations of the objects and the tile positioning indicia within the board areas contained in the given column.

3. An educational device in accordance with claim 2 wherein the cover member is a flat sheet member.

4. An educational device in accordance with claim 1 wherein the dividing lines defining the respective board areas are of the same predetermined identifying color as the color of the tiles.

5. An educational device in accordance with claim 1 wherein the predetermined identifying color on the tiles is defined by a colored peripheral border.

6. An educational device in accordance with claim 1 wherein the tile-receiving surface of the board member is planar.

7. An educational device in accordance with claim 1 including a plurality of board members, wherein the dividing lines on each board member are of a different color from the dividing lines on other board members, and wherein tiles for use with each board member have predetermined colors that are the same as the colors of the dividing lines on an associated board member.

8. An educational device in accordance with claim 7 wherein the names of the objects represented by the pictorial indicia included on a given board member each have the same number of letters.

9. An educational device in accordance with claim 8 wherein all tile positioning indicia on board members including object names having the same number of letters have a color that is different from the color of the tile positioning indicia on board members including object names having a different number of letters.

10. An educational device in accordance with claim 1 wherein the board member includes guide indicia in the form of at least one broad colored line that extends transversely across the board member, for guiding the eye of the user in the direction in which the tiles are to be aligned on the board member.

11. An educational device in accordance with claim 10 wherein the color of the guide indicia on a given board member is the same color as the identifying color of the tiles to be used with the board member.

12. An educational device in accordance with claim 1 wherein the tiles and the tile positioning indicia are rectangular.

13. An educational device in accordance with claim 1 wherein names identifying the objects pictured on the board member in a given transverse row are anagrams.

14. An educational device for developing vocabulary and spelling skills, said device comprising:
   a. a plurality of groups of substantially flat tiles, the tiles in each group of tiles bearing a predetermined color that is different from the color on the tiles of other groups, each tile bearing a letter of the alphabet on at least one surface; and
   b. a plurality of board members each having a tile-receiving surface for receiving a plurality of tiles, the tile-receiving surface divided into a plurality of substantially rectangular sections by colored dividing lines, each of the dividing lines on a given board member having the same color to define a plurality of rows of sections and a plurality of columns of sections, each section including pictorial indicia representative of a respective object whose name is to be spelled within the section, and tile positioning areas within each section and defined by aligned tile positioning indicia carried on the board surface and oriented to allow a user to spell the name of the object illustrated in a section by selecting appropriately colored letter-bearing tiles and placing those tiles on the tile positioning indicia within a respective section;
   c. wherein the tile colors for tiles adapted for use with a particular board member are of the same color as the color of the dividing lines on that board member, and wherein each board member contains object name indicia adjacent the pictorial representation of an object, all the name indicia appearing on a given board member having the same number of letters, the object name indicia spaced from the tile positioning areas to permit the object name indicia to be covered while the tile positioning areas remain uncovered.

15. An educational device in accordance with claim 14 wherein names identifying the objects pictured on the board member in a given transverse row are anagrams.

* * * * *